ANALOG-TO-DIGITAL ENCODER

Filed March 13, 1967

CHARLES R. DERING
INVENTOR.

BY Frederic P. Smith

ATTORNEY

United States Patent Office 3,514,774
Patented May 26, 1970

3,514,774
ANALOG-TO-DIGITAL ENCODER

Charles R. Dering, Los Angeles, Calif., assignor to Litton Systems, Inc., Beverly Hills, Calif., a corporation of Maryland Filed Mar. 13, 1967, Ser. No. 622,510
Int. Cl. G08c 9/08
U.S. Cl. 340—347 3 Claims

ABSTRACT OF THE DISCLOSURE

An analog-to-digital encoder having a track and contact configuration therein in which the leading and trailing edges of each pulse of a plurality of output signals is controlled by a single track and its related contact.

The present invention relates in general to analog-to-digital encoders and in particular to novel apparatus for transforming an analog quantity into a plurality of digital pulses.

Because of the increasing use of the modern digital computer, it has become increasingly more desirable to transform analog quantities into their digital counterparts. One of the most simple and reliable devices for accomplishing this purpose is the analog-to-digital encoder. In this device, the analog signal, in the form of a shaft rotation, is transformed into a diigtal output by means of a code disc which has a preselected pattern of binary characters recorded in the tracks thereon. These tracks are continuously electrically energized and have in contact therewith a number of contacts, such as brushes or pins. As the encoder disc rotates in accordance with the analog input, the contacts send out a stream of electrical pulses representative of the binary coded value of the analog input.

As stated previously, the prior art devices generally include an element having a preselected pattern of binary characters recorded in tracks thereon, and means for sensing the binary characters in each track to produce digital outputs indicative of the position of said element relative to the sensing means. In such previous designs, the digital outputs are generated by, and subject to the inaccuracies of, such discrete tracks and their related contacts. These inaccuracies arise because of the relative misalignment of the tracks and because of the variation in position of the contacts.

The present invention has succeeded in overcoming many of the disadvantages of the prior art devices by providing an analog-to-digital encoder in which the accuracy of a preselected number of outputs is controlled by a single track and the contacts associated therewith. In general, the encoder comprises a code disc having a plurality of tracks thereon, said tracks being composed of discrete conducting and non-conducting segments; means for continually applying electrical energy to at least one of said tracks; a plurality of means, including said last recited means for intermittently electrically energizing preselected ones of said tracks; and sensing means selectively positioned with respect to said tracks for providing output signals representative of the electrical condition of said tracks.

It is therefore the primary purpose of the present invention to provide novel apparatus for more accurately converting analog signals to digital signals.

It is another object of the present invention to provide an improved analog-to-digital encoder in which the accuracy of a plurality of outputs is controlled by a single track and its related contact.

It is a further object of the present invention to provide an improved analog-to-digital encoder in which the position of the leading and trailing edges of a plurality of pulses representative of a preselected number of digital outputs is controlled by a single track and its related contact.

It is still another object of the present invention to provide an analog-to-digital encoder in which each output pulse thereof is a function of the intermitent electrical energization of a plurality of discrete tracks thereon.

These and other objects of the present invention, together with the further features and advantages thereof, will become more apparent from the following detailed specification taken in conjunction with the accompanying drawings. It is to be understood, however, that the detailed specification and the drawings are for purposes of illustration only and are not to be construed as limitations upon the invention. In addition, reference numerals have been carried forward throughout the figures to designate like parts of the invention.

Figure 1:
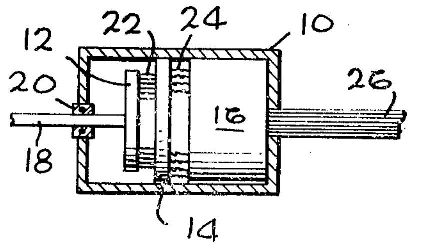
FIG. 1 illustrates, in simplified form, a typical shaft encoder.

In FIG. 1, a simplified shaft encoder is illustrated. The shaft encoder comprises an outer casing 10 which houses an encoder disc 12, a mounting block 14 and a diode package 16. The encoder disc 12 is coupled to an input shaft 18 which in turn is supported by a pair of ball bearings 20. The rotation of the input shaft 18 is indicative of the analog quantity to be translated into its digital counterpart. The encoder disc 12 has a series of tracks thereon (not shown) which are contacted by contacts 22 supported by the mounting block 14. The contacts 22 function to apply electrical energy to the tracks and to sense the electrical condition of the tracks. The contacts 22 are coupled by means of wires 24 to a diode package 16 which electrically isolates the various signals from one another. The output of the diode package 16 is carried by a wire bundle 26 and may be applied to a utilization circuit, such as a computer.

Figures 2, 3:
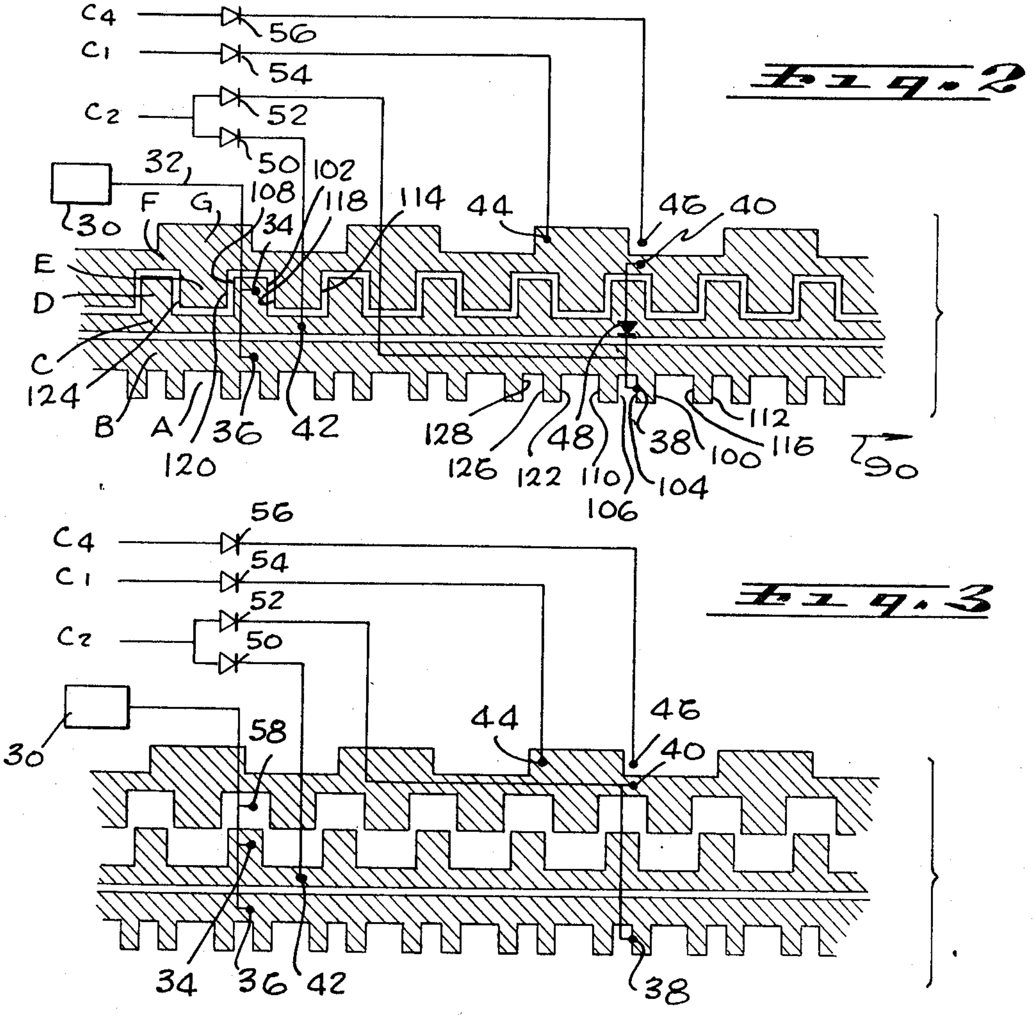
FIG. 2 illustrates the track and contact arrangement of a preferred embodiment of the present invention.
FIG. 3 illustrates an alternative track and contact arrangement of the present invention; and, FIG. 4 illustrates the output waveforms derived from the track and contact arrangement of the present invention.

In FIG. 2 the track and contact arrangement of the present invention is illustrated. Although this track arrangement is most commonly utilized in a closed loop on the surface of an encoder disc, such as shown in FIG. 1, it is readily appreciated that such a track may be linearly laid out as, for example, on the surface of a drum. The tracks shown in FIGS. 2 and 3 are generally composed of a metallic film deposited in a pre-chosen configuration on the surface of an insulating substrate. Alternatively, a continuous metallic film could be deposited on the substrate and the pre-chosen pattern established by selective masking and etching.

Figure 4:
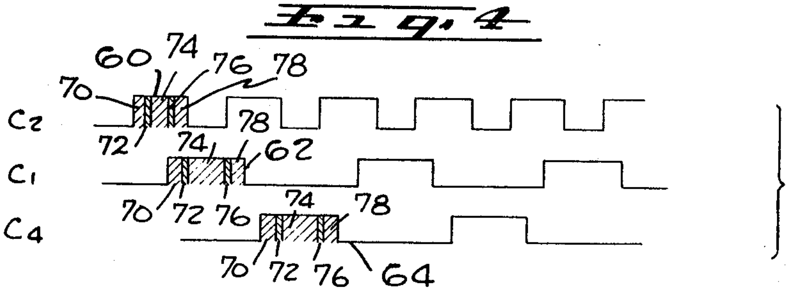

The track pattern utilized for generating the waveforms illustrated in FIG. 4 consists of seven tracks, A through G. Tracks A, D, E, and G are composed of discrete conducting and non-conducting metallic segments while tracks B, C, and F are composed of continuous metallic material. Track B serves to electrically connect all of the individual conducting segments of track A, track C serves to electrically connect all of the conducting segments of track D, and track F serves to electrically connect all of the conducting segments of tracks E and G. A continual source of electrical power 30, such as a D.C. battery, is applied via lead 32 to contacts 34 and 36. Contacts 34 and 36 along with contact 38 act to supply electrical energy, either continually or intermittently, to the tracks A through G. Contact 36 acts to energize tracks A and B on a continual basis while contact 38 energizes track F on an intermittent basis. Contact 38 energizes track F through contact 40 and is coupled thereto by diode 48 which prevents the flow of electrical energy from track F back to contact 38. Contact 34 acts to energize tracks C through G also on an intermittent basis. Contacts 38 and 42 act to supply electrical outputs through diodes 50 and 52 to make up the output signal C2. Contact 44 serves to supply through diode 54 the output signal C1, and contact 46 serves to supply through diode 56 the output signal C4.

An alternative embodiment of the invention is illustrated in FIG. 3 in which tracks D and E have been repositioned with respect to one another so as to not overlap. In this manner, contact 34 serves to intermittently energize tracks C and D alone. An additional contact 58 is provided to intermittently energize tracks E, F and G. In this embodiment, diode 48 is no longer necessary and contact 40, along with contact 42, serves to provide the electrical energy for output signal C2.

The operation of the present invention may best be understood with reference to FIG. 4 (in addition to FIG. 2) which shows the output waveforms 60, 62, and 64 comprising the output signals C2, C1 and C4, respectively. As shown in FIG. 4, each of the pulses comprising output signals C2, C1 and C4 is comprised of five portions 70 through 78, corresponding to time intervals during which the production of the waveform is controlled by different sources of electrical energy. The initial region 70 of waveform 60 is formed by contact 38 contacting edge 100 of track A. It should be realized that in general the various contacts are stationary while tracks A through G are moving to the right as indicated by arrow 90. As the tracks continue to move in the direction of arrow 90, contact 34 contacts edge 102 of track D and thus energizes tracks C and D. Upon such energization, contact 42 also supplies electrical energy (in addition to contact 38) to make up the output signal C2. This is indicated in FIG. 4 by region 72 of waveform 60. As the tracks continue to move, contact 38 leaves edge 104 and contact 42 continues solely to supply electrical energy for output signal C2, as indicated by region 74 of waveform 60. Contact 42 continues to supply electrical energy solely until contact 38 reaches edge 106 of track A. At this point, both contact 42 and contact 38 act to supply electrical energy to output signal C2, as indicated by region 76 in waveform 60. As the tracks continue to move, contact 34 reaches edge 108 in track D and contact 42 ceases to supply electrical energy to output C2. Thus contact 38 acts, at that point, to supply electrical energy solely to output C2, as indicated by region 78 in waveform 60. When contact 38 reaches edge 110 of track A, it too ceases to supply electrical output energy to output signal C2 and the trailing edge of region 78 of waveform 60 occurs. The leading edge of the next pulse of output C2 is not formed until contact 38 reaches edge 122 of track A.

The initial edge of output waveform C1 is formed when contact 38 contacts edge 112 of track A. Contact 38 in turn supplies electrical energy to contact 40 which then energizes tracks E, F and G. During this time, contact 44 is on the conductive portion of track G and supplies electrical energy to form the output signal C1. Contact 38 acts to supply electrical energy solely to contact 44, as indicated by region 70 of waveform 62, until contact 34 contacts edge 114 of track E. Electrical energy is then supplied by contact 34 to tracks E, F and G and thus both contacts 34 and 38 contribute to output signal C1, as indicated by region 72 of waveform 62. Both contacts 34 and 38 continue to supply electrical energy until contact 38 contacts edge 116 and, at this point, contact 34 supplies electrical energy solely to the output signal C1, as indicated by region 74 of waveform 62. When contact 38 contacts edge 100, both contacts 34 and 38 act to supply electrical energy to output signal C1, as indicated by region 76 of waveform 62. When the contact 34 contacts edge 118 of track E, contact 34 ceases to supply electrical energy to output signal C1, and contact 38 acts as the sole source of electrical energy for output signal C1, as indicated by region 78 of waveform 62. The trailing edge of region 78 of waveform 62 occurs when contact 38 contacts edge 104. Although track E, F and G again receive electrical energy when contact 38 contacts edge 106, contact 44 is no longer on a conductive portion of track G and no electrical energy is provided for output signal C1.

Output signal C4 is produced in a manner similar to that of output signal C1. The leading edge of region 70 of waveform 64 is formed when contact 38 contacts edge 106 of track A and electrical energy is supplied through contact 46 (via contact 40) to provide electrical energy for output signal C4. Contact 38 supplies electrical energy solely to output signal C4, as indicated by region 70 of waveform 64, until contact 34 contacts edge 120 of track E. At this point, both contacts 34 and 38 contribute electrical energy to signal C4, as indicated by region 72 of waveform 64. Contact 34 supplies electrical energy solely to signal C4, as indicated by region 74 of waveform 64, when contact 38 reaches edge 110 of track A. This condition continues until contact 38 reaches edge 122 of track A and contributes electrical energy along with contact 34 to output signal C4, as indicated by region 76 of waveform 64. When contact 34 reaches edge 124 of track E, it ceases to supply electrical energy and contact 38 remains the sole source thereof to signal C4, as indicated by region 78 of waveform 64. The trailing edge of region 78 is formed when contact 38 reaches edge 126 of track A and electrical energy is no longer supplied to output C4. Although electrical energy is supplied to track G when contact 38 reaches edge 128, contact 46 is no longer on a conductive portion of track G and thus no electrical energy is supplied to output signal C4.

From the above description of the generation of the output signals C2, C1 and C4, it is thus seen that the formation of the leading and trailing edges of the pulses comprising such signals are governed solely by contact 38 contacting preselected edges of the conductive and nonconductive regions of track A. Thus, the width of each of the pulses and the inception and cessation of one relative to another is governed solely by the single track A. Although the remaining tracks D, E and G must bear a predescribed relative position with respect to track A, the position of these tracks and the position of the contacts related thereto can vary widely before any effect is felt on the leading and trailing edges of the output pulses, the allowed variation being so great under the teachings of the present invention as to present a minimal risk of improper pulse formation.

Having thus described the invention, it is apparent that numerous modifications and apertures therefrom may be made by those skilled in the art. Power supply 30 need not be a D.C. source of electrical energy but may be a continual pulse train. Track C may be eliminated in its entirety if contact 42 is placed directly beneath contact 34 on track D in a fashion so it does not contact track E. Track B may be eliminated if track A is formed from a continuous conductive strip with insulating regions placed thereon, and a source of power is attached to such a strip. As such, the invention as described herein is to be construed to be limited only by the spirit and scope of the appended claims.

What is claimed is:

1. An analog-to-digital encoder comprising:

an element having at least a pair of tracks thereon, each track having discrete conducting and non-conducting segments, a respective non-conducting segment separating each successive pair of conducting segments, a first one of said tracks having a continuous conductive border electrically interconnecting the conducting segments on said first track, a second one of said tracks having a continuous conductive border electrically interconnecting the conducting segments on said second track, each conducting segment in said second track having a length along the track less than the length of a predetermined pair of conducting segments along said first track but greater in length than the non-conducting segment separating said predetermined pair of conducting segments;

means for supplying electrical energy to the continuous conductive border of said second track;

means for supplying electrical energy aligned to contact the conducting and non-conducting segments of said first track; and sensing means for deriving an electrical output signal indicative of the position of said element relative to the sensing means, said sensing means aligned to contact the continuous conductive border of said second track and the conducting and non-conducting segments of said first track wherein said output signal is composed of a series of pulses, said first track supplying electrical energy for the leading and trailing edges of each said pulse, said second track solely supplying electrical energy for a portion of each pulse between the leading and trailing edges of each said pulse.

2. An analog-to-digital encoder comprising:

an element for supporting the plurality of conducting and non-conducting segments;

a first track on said element having a first predetermined pattern of discrete conducting and non-conducting segments and a continuous conductive border, said conducting segments being separated by said non-conducting segments and electrically interconnected by said continuous conductive border;

a second track on said element having second and third predetermined patterns of discrete conducting and non-conducting segments and a continuous conductive border, said conducting segments in said second and third patterns being separated by non-conducting segments and electrically interconnected by said continuous conductive border, each conductive segment in said second pattern having a length along the track less than the length of the predetermined pair of conducting segments in said first pattern around said first track but greater in length than the non-conducting segments separating said predetermined pair of conducting segments, each conducting segment in said third pattern having a length along the track greater than the length of said predetermined pair of conducting segments along said first track;

means for supplying electrical energy to the continuous conductive border of said first track;

means for supplying electrical energy aligned to contact said second pattern of conducting and non-conducting segments;

unidirectionally conducting means for supplying electrical energy intermittently to the continuous conductive border of said second track aligned to contact the conducting and non-conducting segments of said first pattern in said first track; and sensing means for deriving an electrical output signal indicative of the position of said element relative to the sensing means, said sensing means aligned to contact the conducting and non-conducting segments of said third pattern in said second track wherein said output signal is composed of a series of pulses, said first track supplying electrical energy for the leading and trailing edges of each said pulse, said conducting segments of said second pattern on said second track solely supplying electrical energy for a portion of each pulse between the leading and trailing edges of each pulse.

3. An analog-to-digital encoder comprising:

an element for supporting a plurality of conducting and non-conducting segments;

a first track on said element having a first predetermined pattern of discrete conducting and non-conducting segments and a continuous conductive border, said conducting segments being separated by said non-conducting segments and electrically interconnected by said continuous conductive border;

a second track on said element having a second predetermined pattern of discrete conducting and non-conducting segments and a continuous conductive border, said conducting segments being separated by said non-conducting segments and electrically interconnected by said continuous conductive border, each conducting segment in said second pattern having a length along the track less than the length of a first and second conducting segment in a predetermined series of three conducting segments along said first pattern but greater in length than the non-conducting segment between said first and second conducting segments;

a third track on said element having third and fourth predetermined patterns of discrete conducting and non-conducting segments and a continuous conductive border separating said third and fourth patterns, said conducting segments being separated by said non-conducting segments and electrically interconnected by said continuous conductive border, each conducting segment in said third pattern having a length along the track less than the length of said second and a third conducting segment in said predetermined series of three conducting segments along said first track but greater in length than the non-conducting segment between said second and third conducting segments, each conducting segment in said fourth pattern having a length along the track greater than the length of said second and third conducting segments of said predetermined series of three conducting segments;

means for supplying electrical energy to the continuous conductive border of said first track;

means for supplying electrical energy aligned to contact said second and third patterns of conducting and non-conducting segments;

unidirectional conducting means for supplying electrical energy intermittently to the continuous conductive border of said third track aligned to contact the conducting and non-conducting segments of said first pattern in said first track;

first sensing means for deriving a first electrical output signal indicative of the position of said element relative to said first sensing means aligned to contact the continuous conductive border of said second track and the conducting and non-conducting segments of said first pattern in said first track wherein said first output signal is composed of a series of pulses, said first track supplying electrical energy for the leading and trailing edges of each said pulse, said second track solely supplying electrical energy for a portion of each pulse between the leading and trailing edges of each pulse; and second sensing means for deriving a second electrical output signal indicative of the position of said element relative to said second sensing means, said second sensing means aligned to contact the conducting and non-conducting segments of said fourth pattern in said third track wherein said second output signal is composed of a series of pulses, said first track supplying electrical energy for the leading and trailing edges of each said pulse, said conducting segments of said third pattern on said third track solely supplying electrical energy for a portion of each pulse between the leading and trailing edges of each said pulse.

(References on following page)

References Cited

UNITED STATES PATENTS

| | | | |
|---|---|---|---|
| 2,872,671 | 2/1959 | Walton | 340—347 |
| 2,873,442 | 2/1959 | Ziserman | 340—347 |
| 3,070,787 | 12/1962 | Waldron et al. | 340—347 |
| 3,070,789 | 12/1962 | Kristy et al. | 340—347 |

OTHER REFERENCES

Ziserman, M., A Binary Coded Decimal Converter, IRE Transactions on Instrumentation, June 1956, pp. 215–218.

MAYNARD R. WILBUR, Primary Examiner

G. R. EDWARDS, Assistant Examiner